United States Patent
Noh et al.

(10) Patent No.: US 8,953,119 B2
(45) Date of Patent: Feb. 10, 2015

(54) DISPLAY DEVICE

(75) Inventors: Chang-ho Noh, Suwon-si (KR);
Rupasree Ragini Das, Suwon-si (KR);
Seog-jin Jeon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 517 days.

(21) Appl. No.: 13/009,937

(22) Filed: Jan. 20, 2011

(65) Prior Publication Data

US 2011/0261301 A1 Oct. 27, 2011

(30) Foreign Application Priority Data

Apr. 27, 2010 (KR) .................. 10-2010-0039168

(51) Int. Cl.
*G02F 1/1347* (2006.01)
*G02F 1/1335* (2006.01)
*G02F 1/1334* (2006.01)
*G02F 1/137* (2006.01)

(52) U.S. Cl.
CPC ........ *G02F 1/1334* (2013.01); *G02F 1/133514* (2013.01); *G02F 1/13725* (2013.01)
USPC .................. 349/77; 349/78; 349/79; 349/80; 349/106; 349/108

(58) Field of Classification Search
USPC ...................... 349/106–109, 77–80
See application file for complete search history.

(56) References Cited

U.S. PATENT DOCUMENTS

| | | | | |
|---|---|---|---|---|
| 5,841,492 | A | * | 11/1998 | Iwauchi et al. ............... 349/74 |
| 2005/0094059 | A1 | * | 5/2005 | Noguchi ...................... 349/106 |
| 2009/0102352 | A1 | * | 4/2009 | Cok et al. ..................... 313/498 |
| 2009/0244441 | A1 | * | 10/2009 | Nagato et al. ................ 349/78 |
| 2010/0002175 | A1 | * | 1/2010 | Kim et al. .................... 349/115 |
| 2010/0238389 | A1 | * | 9/2010 | Chan et al. ................... 349/107 |

FOREIGN PATENT DOCUMENTS

| | | |
|---|---|---|
| JP | 2005-049772 | 2/2005 |
| JP | 2007-292962 | 11/2007 |
| JP | 2008-261981 | 10/2008 |
| KR | 1020080054352 A | 6/2008 |
| KR | 1020080099440 A | 11/2008 |

* cited by examiner

*Primary Examiner* — Charles Chang
(74) *Attorney, Agent, or Firm* — Cantor Colburn LLP (57) ABSTRACT

A display device includes a first electrode layer, a color switching layer which is disposed on the first electrode layer, a second electrode layer which is disposed on the color switching layer and a color filter layer which is disposed on the second electrode layer. The color switching layer includes a first color cell, which transmits incident light or changes incident light to a first color light, a second color cell, which transmits incident light or changes incident light to a second color light and a third color cell, which transmits incident light or changes incident light to a third color light. The color filter layer includes a first filter which transmits a cyan light, a second filter which transmits a magenta light and a third filter which transmits a yellow light.

23 Claims, 5 Drawing Sheets

DISPLAY DEVICE

CROSS-REFERENCE TO RELATED APPLICATIONS

This application claims priority to Korean Patent Application No. 10-2010-0039168, filed on Apr. 27, 2010, and all the benefits accruing therefrom under 35 U.S.C. §119, the disclosure of which is incorporated herein in its entirety by reference.

BACKGROUND

1. Field

Provided are display devices for displaying color images by using cyan, magenta, and yellow color filters.

2. Description of the Related Art

Devices using reflective display devices, such as electronic reading devices (e.g., e-book), are being actively developed and commercialized. Although products commercialized hitherto employ a black and white displaying method, most products to be further commercialized employ color displaying method. Color reflective display devices generally uses red ("R"), green ("G"), and blue ("B") color filters. However, when RGB color filters are used, only a portion of white light contributes to formation of images, and thus, light efficiency is relatively low.

Research has been conducted to form a color image by using an electrochromic device which may switch a white color to a red, green, or blue color without using a color filter. However, in this case, although white color reflectivity is relatively high, it is difficult to form a black color and only colors in a relatively narrow range may be formed.

SUMMARY

Provided are display devices for displaying color images by using cyan, magenta, and yellow color filters.

Additional aspects will be set forth in part in the description which follows and, in part, will be apparent from the description, or may be learned by practice of the presented embodiments.

Provided is a display device which includes a first electrode layer, a reflective layer which is disposed on the first electrode layer, a color switching layer which is disposed on the reflective layer and includes a first color cell which transmits incident light or changes incident light to a first color light, a second color cell which transmits incident light or changes incident light to a second color light and a third color cell which transmits incident light or changes incident light to a third color light, a second electrode layer which is disposed on the color switching layer, and a color filter layer which is disposed on the second electrode layer and includes a first filter which transmits a cyan light, a second filter which transmits a magenta light, and a third filter which transmits a yellow light.

In an embodiment, the first color light may have a color complementary with respect to the cyan light, the second color light may have a color complementary with respect to the magenta light, and the third color light may have a color complementary with respect to the yellow light.

In an embodiment, the first color light may include a red light, the second color light may include a green light, and the third color light may include a blue light.

In an embodiment, at least one of the first electrode layer and the second electrode layer may include a transparent conductive material.

In an embodiment, the color switching layer may include an electrochromic layer.

In an embodiment, the color switching layer may include a polymer dispersed liquid crystal ("PDLC") layer mixed with a dichroic dye.

In an embodiment, the color switching layer may include red, green, and blue cholesteric liquid crystal layers.

In an embodiment, the color switching layer may include an electronic ink (e.g., e-ink) layer having red, green, blue, and white color balls.

In an embodiment, the first color cell and the first filter may be arranged to face each other, the second color cell and the second filter may be arranged to face each other, and the third color cell and the third filter may be arranged to face each other.

In an embodiment, the color filter layer may further include a fourth filter, which transmits incident light.

In an embodiment, the color switching layer may further include a fourth color cell which may be arranged to face the fourth filter.

In an embodiment, the fourth color cell may transmit incident light or may change incident light to a black light.

In an embodiment, the color switching layer transmits incident light or changes colors of incident light at each of color cells according to voltage application to the color cells.

Provided is a display device includes a first electrode layer, a color switching layer which may be disposed on the first electrode layer and may include a first color cell which transmits incident light or changes incident light to a first color light, a second color cell which transmits incident light or changes incident light to a second color light, and a third color cell, which transmits incident light or changes incident light to a third color light, a second electrode layer which may be disposed on the color switching layer and a color filter layer which may be disposed on the second electrode layer and may include a first filter which transmits a cyan light, a second filter which transmits a magenta light, and a third filter which transmits a yellow light.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout and the size and relative sizes of layers and regions may be exaggerated for clarity. In this regard, the embodiments may have different forms and should not be construed as being limited to the descriptions set forth herein. Accordingly, the embodiments are merely described below, by referring to the figures, to explain the present invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
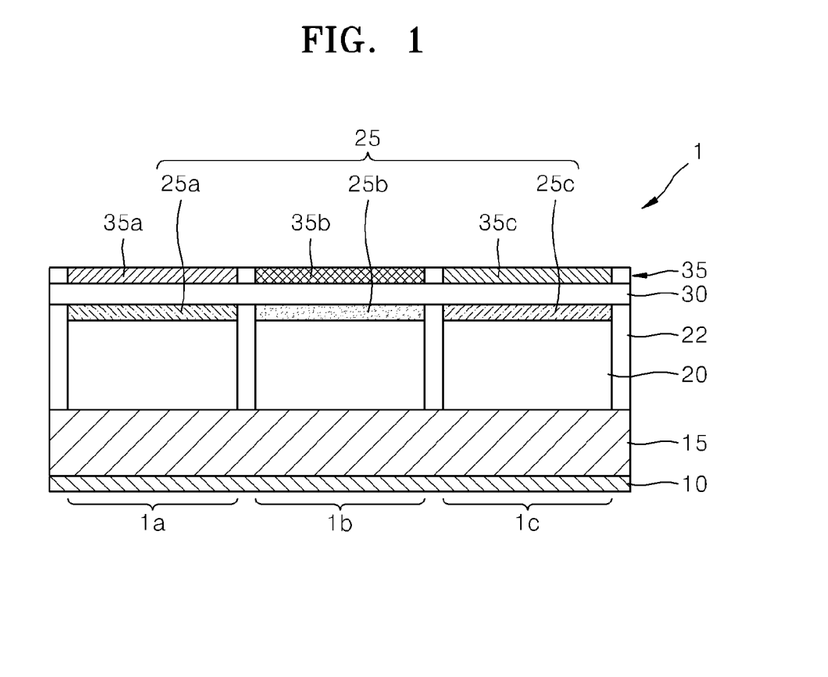
FIG. 1 is a diagram of an embodiment of a display device, according to the present invention.

FIG. 1 is a diagram of an embodiment of a display device, according to the present invention. In the display device, a plurality of a pixel may be arranged in a matrix shape. For convenience of explanation, FIG. 1 shows only one pixel 1 of the display device. The pixel 1 may include a plurality of a sub-pixel, and a color image of the display device may include color lights from each of the sub-pixels which are mixed together. Each of the sub-pixels may emit a different color light. However, the sub-pixels are not limited thereto, and the pixel 1 may include a plurality of a sub-pixel, which emits the same color light, in consideration of brightness or efficiency of each color light. In one embodiment, for example, the pixel 1 may include a first sub-pixel 1a, a second sub-pixel 1b, and a third sub-pixel 1c.

The display device shown in FIG. 1 may include a first electrode layer 10, a color switching layer 25 disposed on the first electrode layer 10, a second electrode layer 30 disposed on the color switching layer 25, and a color filter layer 35 disposed on the second electrode layer 30. The color switching layer 25 is interposed between the first electrode layer 10 and the second electrode layer 30, and may switch the color of incident light as a voltage is applied thereto.

The first electrode layer 10 and the second electrode layer 30 may be arranged in a passive matrix ("PM") arrangement or an active matrix ("AM") arrangement. In a case of the PM arrangement, each of the first electrode layer 10 and the second electrode layer 30 may be arranged in stripes to cross each other, in a plan view of the display device. In a case of the AM arrangement, the first electrode layer 10 may be a common electrode, whereas the second electrode layer 30 may be a pixel electrode arranged in correspondence to the sub-pixels 1a, 1b, and 1c. Alternatively, the first electrode layer 10 may be a pixel electrode, whereas the second electrode layer 30 may be a common electrode.

At least one of the first electrode layer 10 and the second electrode layer 30 may include a transparent conductive material, such as indium tin oxide ("ITO"). In FIG. 1, the second electrode layer 30 via which light is incident, may include a transparent material. However, the present invention is not limited thereto, and both the first electrode layer 10 and the second electrode layer 30 may include a transparent material.

A partition 22 may be interposed between each pair of adjacent sub-pixels of the color switching layer 25, to reduce or effectively prevent mixtures of colors within the sub-pixels. Furthermore, a reflective layer 15 may be interposed between the color switching layer 25 and the first electrode layer 10. The reflective layer 15 reflects light incident from an outside of the display device back toward the outside.

The color filter layer 35 may include a plurality of a filter which transmits predetermined color lights. In one embodiment, for example, the color filter layer 35 may include a first filter 35a which transmits cyan light, a second filter 35b which transmits magenta light, and a third filter 35c which transmits yellow light. The color filter layer 35 including a cyan filter, a magenta filter, and a yellow filter has high light transmittance, and thus colors with high reflectivity may be formed. Furthermore, black, white, and various other colors may be formed through color combinations using the color filter layer 35 and the color switching layer 25.

The color switching layer 25 may operate in a transmittance mode for transmitting incident light, and a color changing mode for changing incident light to a predetermined color light. Each color cell of the color switching layer 25 may be switched between the transmittance mode and the color changing mode by applying a voltage thereto. The color switching layer 25 forms colors in cooperation with the color filter layer 35, and may include a first color cell 25a, a second color cell 25b, and a third color cell 25c. The first color cell 25a may transmit incident light or change incident light to a first color light. The second color cell 25b may transmit incident light or change incident light to a second color light. The third color cell 25c may transmit incident light or change incident light to a third color light. The first color light may have a color complementary with respect to the cyan light, the second color light may have a color complementary with respect to the magenta light, and the third color light may have a color complementary with respect to the yellow light. In one embodiment, for example, the first color light may be a red light, the second color light may be a green light, and the third color light may be a blue light.

In an embodiment of the present invention, the color switching layer 25 may include an electrochromic device, for example. An electrochromic device displays images through absorption of natural light, and thus, has advantages such as low eye fatigue, low viewing angle dependency, memory characteristics, and small power consumption.

The color of the electrochromic device may be reversibly changed through electrochemical changes of an electrochromic material according to the direction of an electric field when a voltage is applied thereto. In one embodiment, for example, an electrochromic material may contain a cathodic coloration material which has a certain color in a reduction state, and is transparent in an oxidation state. The electrochromic material may be an organic material or an inorganic material. The cathodic coloration material may contain an inorganic material, such as $WO_3$, $MoO_3$, $TiO_3$, or the like, for example. Alternatively, the cathodic coloration material may include organic materials, such as phthalate-based compound, such as viologen or isophthalate, a pyridine-based compound, an anthraquinone-based compound, an aminoquinone-based compound, a rare-earth-based organic metal compound, phthalocyanine, a ruthenium-based organic metal compound, a leuco dye-based compound, and a polymer-based electrochromic material.

Alternatively, an electrochromic material may contain an anodic coloration material which is transparent in a reduction state, and has a certain color in an oxidation state. The anodic coloration material may contain $V_2O_5$, $IrO_2$, $Nb_2O_5$, or NiO, for example. Alternatively, the anodic coloration material may include organic compounds, such as phenothiazine or a polymer-based electrochromic material. From among the electrochromic materials, electrochromic materials which may be changed from a transparent state to a red color, green color, or blue color are used.

Furthermore, an electrochromic layer may contain an electrochromic material doped with nanoparticles. The nanoparticles may include a semiconductor material. Alternatively, the nanoparticles may include $TiO_2$, $ZnO_2$, $WO_3$, or the like. Furthermore, the nanoparticles may have various shapes including a sphere, a tetrahedron, a cylinder, a triangle, a disc, a tripod, a tetrapod, a cube, a box, a star, a tube, etc. The size of a nanoparticle may be from about 1 nanometer (nm) to about 100 nanometers (nm). If nanoparticles are used in the electrochromic layer, the surface area of the electrochromic layer increases, and thus more electrochromic material may be applied. Therefore, the electrochromic device may be operated with improved efficiency.

Furthermore, the electrochromic layer may be a layer in which a polymer compound and an electrochromic material are mixed without being doped with nanoparticles. The electrochromic layer may contain a mixture, which contains from about 1 weight % to about 50 weight % of a polymer compound, such as polyvinylpyrrolidone, polyvinyl butyral, polyvinyl alcohol, or the like, and from about 50 weight % to about 99 weight % of an electrochromic material.

The color switching layer 25 may include a polymer dispersed liquid crystal ("PDLC") layer mixed with a dichroic dye. The PDLC layer may include a polymer and liquid crystals dispersed in the polymer. The PDLC layer may form an image via anisotropy of liquid crystals. Liquid crystals are anisotropic, which also applies to an ordinary refractive index and extraordinary refractive index, whereas a polymer is isotropic. If no electric field is applied to the color switching layer 25, dispersed liquid crystals are not oriented in a constant direction, and thus the refractive index of the polymer and the refractive index of the liquid crystals differ from each other. Therefore, diffusion occurs between the polymer and the liquid crystals, and thus the PDLC layer becomes opaque. A color is formed based on a dye contained in the PDLC layer.

If an electric field is applied to the color switching layer 25, the liquid crystals are oriented in a direction parallel to the direction of the electric field, and the refractive index of the polymer and the ordinary refractive index of the liquid crystals become equal to each other, and thus the PDLC layer becomes transparent. Each sub-pixel of the PDLC layer may include a dye of a predetermined color. In one embodiment, for example, a first color cell of the PDLC layer may include a red dye, a second color cell of the PDLC layer may include a green dye, and a third color cell of the PDLC layer may include a blue dye. The dyes may be included in either of the polymer or the liquid crystals or in both of the polymer and the liquid crystals.

Alternatively, the color switching layer 25 may include red, green, and blue cholesteric liquid crystal layers or an electronic ink (e.g., e-ink) layer having red, green, blue, and white color balls, for example.

FIG. 1 shows an embodiment using an electrochromic device as the color switching layer 25, where an electrolyte layer 20 may be interposed between the reflective layer 15 and the color switching layer 25, so that ions may move through the electrolyte layer 20 when electrochromism occurs.

Figure 2:
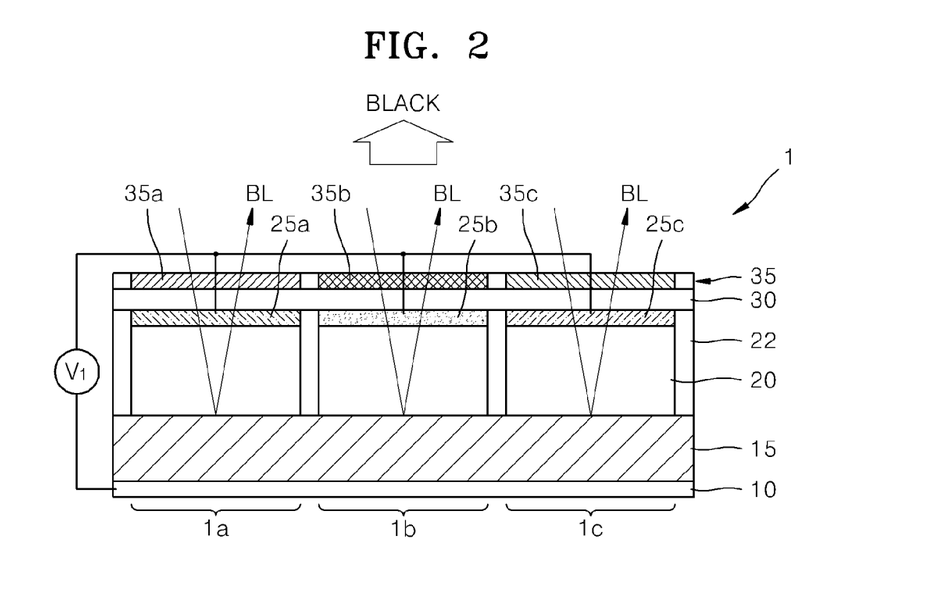
FIGS. 2 through 4 are diagrams for describing embodiments of a method of operating the display device shown in FIG. 1.
Figure 3:
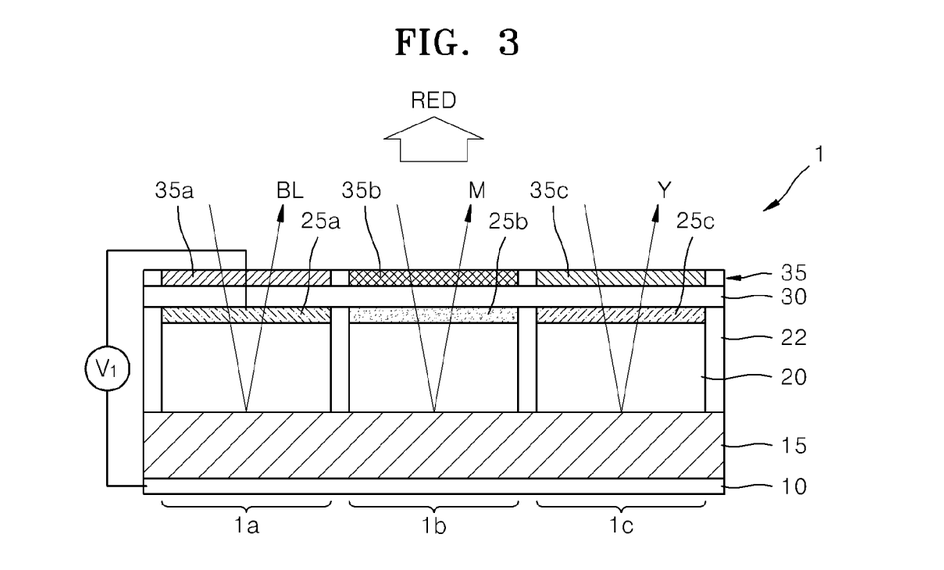
Figure 4:
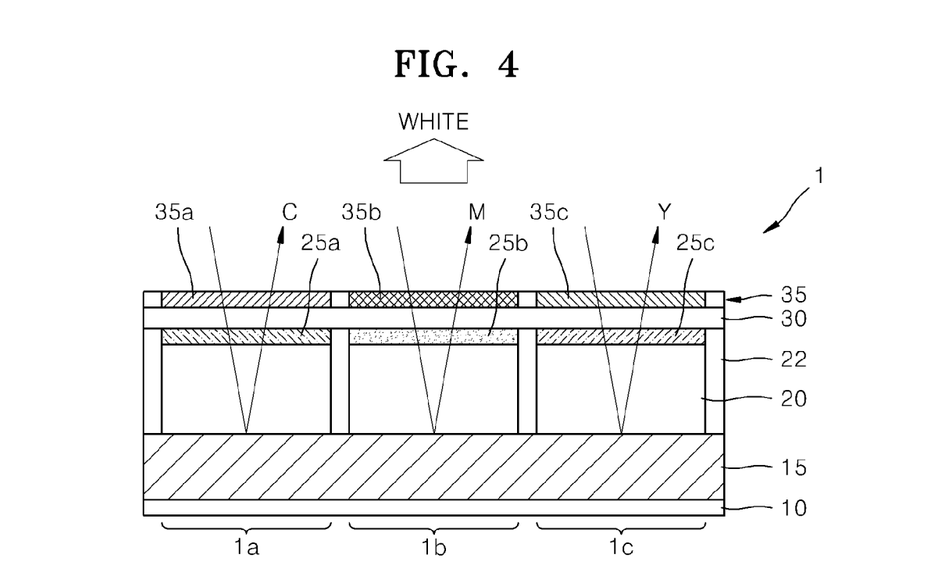

FIGS. 2 through 4 are diagrams for describing embodiments of a method of operating the display device shown in FIG. 1.

Referring to FIG. 2, a first voltage V1 is applied to each of the first color cell 25a, the second color cell 25b, and the third color cell 25c. In one embodiment, for example, the first color cell 25a may form a red color when a voltage is applied thereto, the second color cell 25b may form a green color when a voltage is applied thereto, and the third color cell 25c may form a blue color when a voltage is applied thereto. Furthermore, the first filter 35a transmits a cyan light, the second filter 35b transmits a magenta light, and the third filter 35c transmits a yellow light.

When a white light is incident from the outside initially through the color filter layer 35 as shown by the first portion of the arrow in FIG. 2, a cyan light is transmitted through the first filter 35a and towards the first color cell 25a, the cyan light is mixed with red color at the first color cell 25a, and thus black ("BL") color is formed within the first sub-pixel 1a. Furthermore, from the white light, a magenta light is transmitted through the second filter 35b and towards the second color cell 25b, the magenta light is mixed with green color at the second color cell 25b, and thus BL color is formed within the second sub-pixel 1b. Furthermore, from the white light, a yellow light is transmitted through the third filter 35c and towards the third color cell 25c, is mixed with blue color at the third color cell 25c, and thus BL color is formed within the third sub-pixel 1c. As a result, the BL color light from each of the first to third sub-pixels 1a, 1b and 1c are effectively mixed, and thus black color BLACK is formed by the pixel 1.

Referring to FIG. 3, the first voltage V1 is applied to the first color cell 25a only, and either no voltage or an inverse voltage is applied to the second color cell 25b and the third color cell 25c. As a result, the first color cell 25a forms a red color, and the second color cell 25b and the third color cell 25c become transparent. Therefore, a cyan light is transmitted through the first filter 35a from a white light and towards the first color cell 25a, the cyan light is mixed with the red color at the first color cell 25a, and thus BL color is formed in the first sub-pixel 1a. A magenta light M is transmitted through the second filter 35b from a white light and towards the second color cell 25b, the magenta light M is transmitted through the transparent second color cell 25b and is reflected outward by the reflective layer 15, and thus the magenta light M travels to the outside of the second sub-pixel 1b through the second color cell 25b and the second filter 35b. A yellow light Y is transmitted through the third filter 35c from a white light and towards the third color cell 25c, the yellow light Y is transmitted through the transparent third color cell 25c and is reflected outward by the reflective layer 15, and thus yellow light Y travels to the outside of the third sub-pixel 1c through the third color cell 25c and the third filter 35c. As a result, the magenta light M from the second sub-pixel 1b and the yellow light Y from the third sub-pixel 1c are mixed, and thus red color RED is formed by the pixel 1.

In an alternative embodiment of FIG. 3, in a case of applying the first voltage V1 to the second color cell 25b only, and applying either no voltage or an inverse voltage to the first color cell 25a and the third color cell 25c, cyan color may be formed through the combination of the first filter 35a and the first color cell 25a in the first sub-pixel 1a, BL color may be formed through the combination of the second filter 35b and the second color cell 25b in the second sub-pixel 1b, and yellow color may be formed through the combination of the third filter 35c and the third color cell 25c in the third sub-pixel. As a result, the cyan color from the first sub-pixel 1a and the yellow color Y from the third sub-pixel 1c are mixed, and thus green color is formed by the pixel 1.

Furthermore, in a case of applying the first voltage V1 to the third color cell 25c only, and applying either no voltage or an inverse voltage to the first color cell 25a and the second color cell 25b, cyan color may be formed through the combination of the first filter 35a and the first color cell 25a in the first sub-pixel 1a, magenta color M may be formed through the combination of the second filter 35b and the second color cell 25b in the second sub-pixel 1b, and BL color may be formed through the combination of the third filter 35c and the third color cell 25c in the third sub-pixel 1c. As a result, the cyan color from the first sub-pixel 1a and the magenta color M from the second sub-pixel 1b are mixed, and thus blue color is formed by the pixel 1.

Furthermore, in a case of applying the first voltage V1 to the first color cell 25a and the second color cell 25b and applying either no voltage or an inverse voltage to the third color cell 25c, BL color may be formed through the combination of the first filter 35a and the first color cell 25a in the first sub-pixel 1a, BL color may be formed through the combination of the second filter 35b and the second color cell 25b in the second sub-pixel 1b, and yellow color Y may be formed through the combination of the third filter 35c and the third color cell 25c in the third sub-pixel 1c. As a result, the yellow color Y is formed by the pixel 1. In alternative embodiments, cyan color or magenta color may also be formed by the above method, where two of three sub-pixels are applied with the first voltage V1.

Referring to FIG. 4, either no voltage or an inverse voltage is applied to the first color cell 25a, the second color cell 25b, and the third color cell 25c. As a result, all of the first color cell 25a, the second color cell 25b, and the third color cell 25c become transparent. A cyan light C is transmitted through the first filter 35a from a white light and towards the first color cell 25a, the cyan light C is transmitted through the transparent first color cell 25a and is reflected outward by the reflective layer 15, and thus the cyan light C travels to the outside of the first sub-pixel 1a. Furthermore, a magenta light M is transmitted through the second filter 35b from a white light and towards the second color cell 25b, the magenta light M is transmitted through the transparent second color cell 25b and is reflected outward by the reflective layer 15, and thus the magenta light M travels to the outside of the second sub-pixel 1b. Furthermore, a yellow light Y is transmitted through the third filter 35c from a white light and towards the third color cell 25c, the yellow light Y is transmitted through the transparent third color cell 25c and is reflected outward by the reflective layer 15, and thus the yellow light Y travels to the outside of the third sub-pixel 1c. As a result, the cyan light C from the first sub-pixel 1a, the magenta light M from the second sub-pixel 1b, and the yellow light Y from the third sub-pixel 1c are mixed, and thus white color WHITE is formed by the pixel 1.

As described above, when all of the color cells of the color switching layer 25 are transparent, a cyan light C, a magenta light M, and a yellow light Y, which are lights of natural colors of the first, second and third color filters 35a, 35b and 35c, may be reflected within the first, second and third sub-pixels 1a, 1b and 1c to form a white color WHITE of the pixel 1. Here, light transmitted through the color filter layer 35 may form a black color based on subtractive color mixture when the color switching layer 25 is in the color changing mode, whereas light transmitted through the color filter layer 35 may form a white color based on additive color mixture when the color switching layer 25 is in the transmittance mode.

Figure 5:
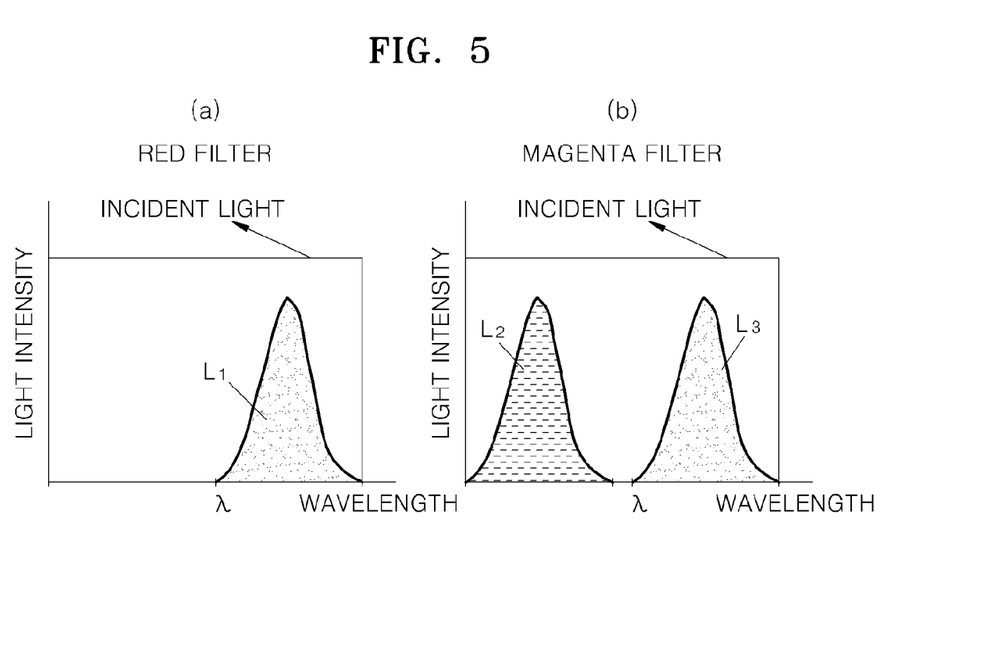
FIG. 5 is a diagram showing embodiments of light intensities according to wavelengths of light transmitted through a red filter, and light intensities according to wavelengths of light transmitted through a magenta filter.

FIG. 5 is a diagram showing embodiments of light intensities according to wavelengths of light transmitted through a red filter, and light intensities according to wavelengths of light transmitted through a magenta filter, for example. Only a red light L1 is transmitted through the red filter, whereas a blue light L2 and a red light L3 are transmitted through the magenta filter. Therefore, an amount of light transmitted through the magenta filter is greater than an amount of light transmitted through the red filter. As described above, amounts of lights transmitted through cyan, magenta, and yellow filters are greater than amounts of lights transmitted through red, green, and blue filters, and thus lights transmitted through cyan, magenta, and yellow filters form a white color with relatively high brightness. Therefore, a higher black and white contrast ratio may be obtained by using cyan, magenta, and yellow filters as compared to the case of using red, green, and blue filters. Furthermore, according to the illustrated embodiments, white color, black color, and various other colors may be formed through color combinations using cyan, magenta, and yellow color filters, and red, green, and blue color switching layers.

Figure 6:
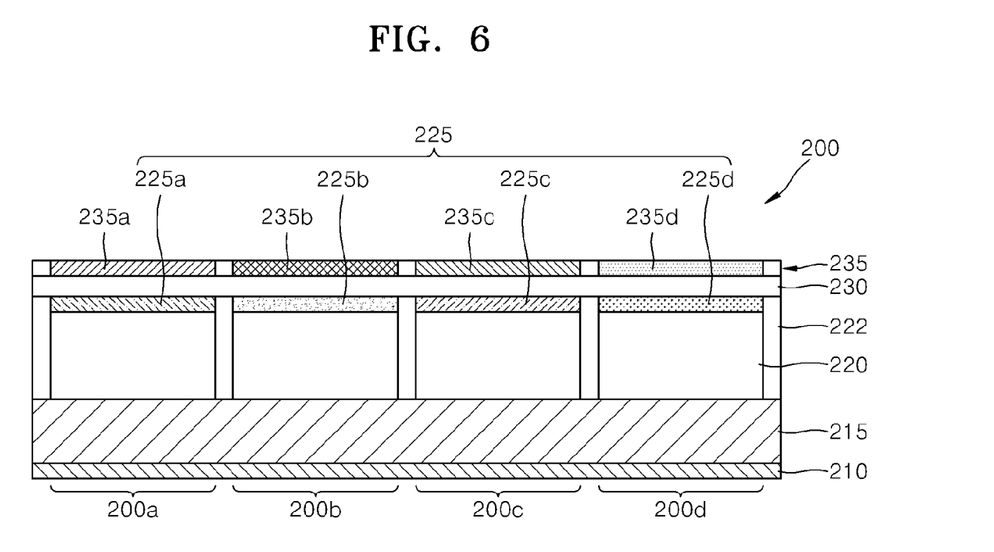
FIG. 6 is a diagram of another embodiment of a display device, according to the present invention.

FIG. 6 is a diagram of another embodiment of a display device, according to the present invention. In the display device shown in FIG. 6, a plurality of a pixel may be arranged in a matrix shape. For convenience of explanation, FIG. 6 shows only one pixel 200 of the display device. The pixel 200 may include a plurality of a sub-pixel, and a color image of the display device may include color lights from each of the sub-pixels which are mixed together. Each of the sub-pixels may emit different color lights. However, the present invention is not limited thereto, and the pixel 200 may include a plurality of a sub-pixel, which emits the same color light, in consideration of brightness or efficiency of each color light. In one embodiment, for example, the pixel 200 may include a first sub-pixel 200a, a second sub-pixel 200b, a third sub-pixel 200c, and a fourth sub-pixel 200d.

The display device shown in FIG. 6 may include a first electrode layer 210, a color switching layer 225 which is disposed on the first electrode layer 210, a second electrode layer 230 which is disposed on the color switching layer 225, and a color filter layer 235 which is disposed on the second electrode layer 230. The color switching layer 225 is interposed between the first electrode layer 210 and the second electrode layer 230, and may switch the color of incident light as a voltage is applied to the color switching layer 225.

The first electrode layer 210 and the second electrode layer 230 may be arranged in a PM arrangement or an AM arrangement. In a case of the PM arrangement, each of the first electrode layer 210 and the second electrode layer 230 may be arranged in stripes to cross each other, in a plan view of the display device. In a case of the AM arrangement, the first electrode layer 210 may be a common electrode, whereas the second electrode layer 230 may be a pixel electrode arranged in correspondence to the sub-pixels 200a, 200b, 200c, and 200d. Alternatively, the first electrode layer 210 may be a pixel electrode, whereas the second electrode layer 230 may be a common electrode. At least one of the first electrode layer 210 and the second electrode layer 230 may include a transparent conductive material, such as ITO.

A partition 222 may be interposed between each pair of adjacent sub-pixels of the color switching layer 225, to reduce or effectively prevent mixtures of colors within the sub-pixels. Furthermore, a reflective layer 215 may be interposed between the color switching layer 225 and the first electrode layer 210. The reflective layer 215 reflects externally incident light toward the outside. The reference numeral 220 indicates an electrolyte layer.

The color filter layer 235 may include a plurality of a filter which transmits predetermined color lights. In one embodiment, for example, the color filter layer 235 may include a first filter 235a which transmits cyan light, a second filter 235b which transmits magenta light, a third filter 235c which transmits yellow light, and a fourth filter 235d, which transmits white light. In one embodiment, for example, the fourth filter 235d may be formed as a transparent layer.

The color switching layer 225 may operate in a transmittance mode for transmitting incident light, and a color changing mode for changing incident light to predetermined color light. The color switching layer 225 forms colors in cooperation with the color filter layer 235, and may include a first color cell 225a, a second color cell 225b, a third color cell 225c, and a fourth color cell 225d. The first color cell 225a may transmit incident light or change incident light to a first color light. The second color cell 225b may transmit incident light or change incident light to a second color light. The third color cell 225c may transmit incident light or change incident light to a third color light. The fourth color cell 225d may transmit incident light or change incident light to a fourth color light. The first color light may have a color complementary with respect to the cyan light, the second color light may have a color complementary with respect to the magenta light, and the third color light may have a color complementary with respect to the yellow light. In one embodiment, for example, the first color light may be a red light, the second color light may be a green light, and the third color light may be a blue light. Furthermore, the fourth color light may be a black light.

In an embodiment of the present invention, the color switching layer 225 may include an electrochromic device, for example. The color switching layer 225 may include a PDLC layer mixed with a dichroic dye. Alternatively, the color switching layer 225 may include red, green, and blue cholesteric liquid crystal layers or an e-ink layer having red, green, blue, and white color balls, for example. Since the mechanism of the color switching layer 225 has been described above, a detailed description thereof will be omitted here.

Figure 7:
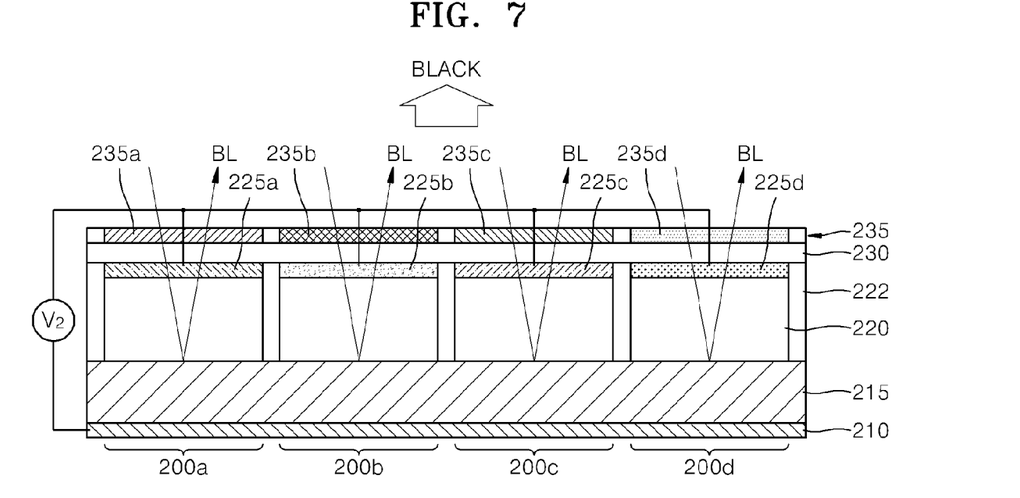
FIGS. 7 through 9 are diagrams for describing embodiments of a method of operating the display device shown in FIG. 6.
Figure 8:
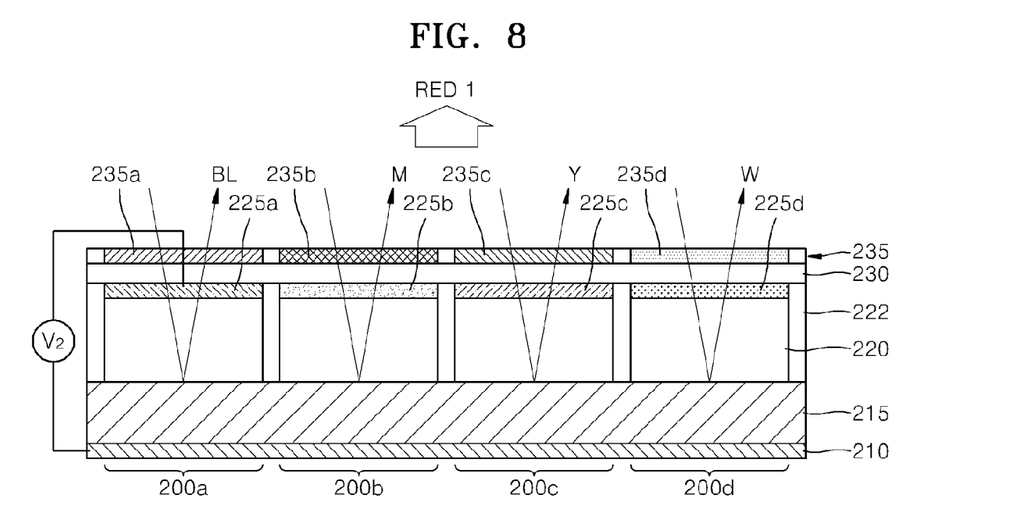
Figure 9:
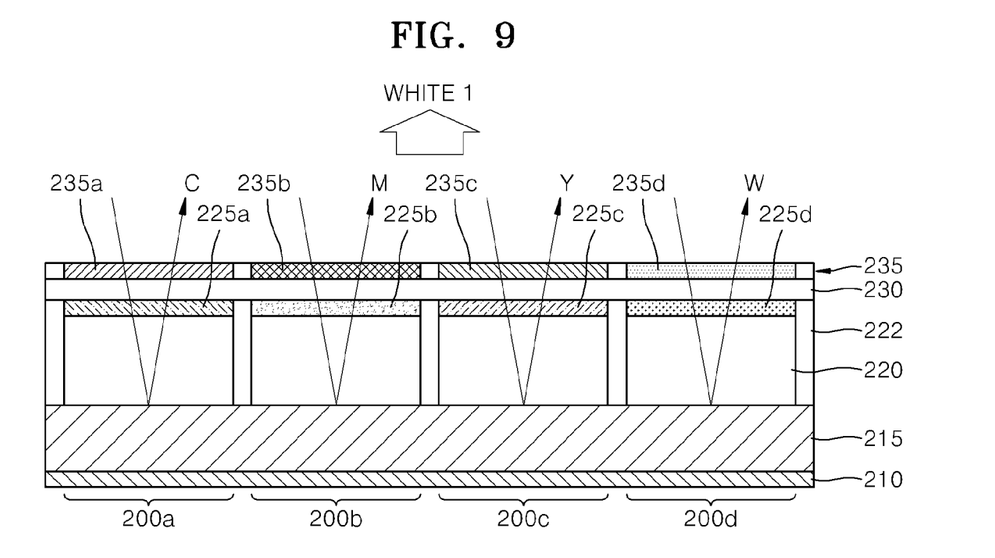

FIGS. 7 through 9 are diagrams for describing embodiments of a method of operating the display device shown in FIG. 6.

Referring to FIG. 7, a second voltage V2 is applied to each of the first color cell 225a, the second color cell 225b, the third color cell 225c, and the fourth color cell 225d. In one embodiment, for example, the first color cell 225a may form a red color when a voltage is applied thereto, the second color cell 225b may form a green color when a voltage is applied thereto, the third color cell 225c may form a blue color when a voltage is applied thereto, and the fourth color cell 225d may form a black color when a voltage is applied thereto. Furthermore, the first filter 235a may transmit a cyan light, the second filter 235b may transmit a magenta light, the third filter 235c may transmit a yellow light, and the fourth filter 235d may transmit a white light.

When a white light incident from the outside initially through the color filter layer 235 as shown by the first portion of the arrow in FIG. 7, a cyan light is transmitted through the first filter 235a and towards the first color cell 225a, the cyan light is mixed with red color at the first color cell 225a, and thus a BL color is formed within the first sub-pixel 200a. Furthermore, from the white light, a magenta light is transmitted through the second filter 235b and towards the second color cell 225b, is mixed with green color at the second color cell 225b, and thus a BL color is formed within the second sub-pixel 200b. Furthermore, from the white light, a yellow light is transmitted through the third filter 235c and towards the third color cell 225c, is mixed with blue color at the third color cell 225c, and thus a BL color is formed within the third sub-pixel 200c. Furthermore, the white light is transmitted through the fourth filter 235d towards the fourth color cell 225d, the white light is mixed with BL color at the fourth color cell 225d, and thus a BL color is formed within the fourth sub-pixel 200d. As a result, the BL color light from each of the first to fourth sub-pixels 200a, 200b, 200c and 200d are effectively mixed, and thus black color BLACK may be formed in a corresponding pixel 200.

Referring to FIG. 8, the second voltage V2 is applied to the first color cell 225a only, and either no voltage or an inverse voltage is applied to the second color cell 225b, the third color cell 225c, and the fourth color cell 225d. As a result, the first color cell 225a forms a red color, and the second color cell 225b, the third color cell 225c, and the fourth color cell 225d become transparent. Therefore, a cyan light is transmitted through the first filter 235a from a white light and towards the first color cell 225a, the cyan light is mixed with the red color at the first color cell 225a, and thus a BL color is formed in the first sub-pixel 200a. A magenta light M is transmitted through the second filter 235b from a white light and towards the second color cell 225b, the magenta light M is transmitted through the transparent second color cell 225b and is reflected outward by the reflective layer 215, and thus the magenta light M travels to the outside of the second sub-pixel 200*b* through the second color cell 225*b* and the second filter 235*b*. A yellow light Y is transmitted through the third filter 235*c* from a white light and towards the third color cell 225*c*, the yellow light Y is transmitted through the transparent third color cell 225*c* and is reflected outward by the reflective layer 215, and thus the yellow light Y travels to the outside of the third sub-pixel 200*c* through the third color cell 225*c* and the third filter 235*c*. Furthermore, the white light W is transmitted through the fourth filter 235*d*, the white light W is transmitted through the transparent fourth color cell 225*d* and is reflected outward by the reflective layer 215, and thus the white light W travels to the outside of the fourth sub-pixel 200*d*. As a result, the magenta light M from the second sub-pixel 200*b*, the yellow light Y from the third sub-pixel 200*c*, and the white light W from the fourth sub-pixel 200*d* are mixed, and thus a red color RED1 may be formed by the pixel 200. The red color RED1 may be formed as a brighter red color as compared to the red color RED described above with reference to FIG. 3.

In an alternative embodiment of FIG. 7, in a case of applying the second voltage V2 to the second color cell 225*b* only, and applying either no voltage or an inverse voltage to the first color cell 225*a*, the third color cell 225*c*, and the fourth color cell 225*d*, a cyan color may be formed through the combination of the first filter 235*a* and the first color cell 225*a* in the first sub-pixel 200*a*, a BL color may be formed through the combination of the second filter 235*b* and the second color cell 225*b* in the second sub-pixel 200*b*, a yellow color Y may be formed through the combination of the third filter 235*c* and the third color cell 225*c* in the third sub-pixel 200*c*, and a white color may be formed through the combination of the fourth filter 235*d* and the fourth color cell 225*d* in the fourth sub-pixel 200*d*. As a result, the cyan color from the first sub-pixel 200*a*, the yellow color Y from the third sub-pixel 200*c*, and the white color W from the fourth sub-pixel 200*d* are mixed, and thus a bright green color may be formed by the pixel 200. Furthermore, in a case of applying the second voltage V2 to the third color cell 225*c* only, and applying either no voltage or an inverse voltage to the first color cell 225*a*, the second color cell 225*b*, and the fourth color cell 225*d*, a cyan color may be formed through the combination of the first filter 235*a* and the first color cell 225*a* in the first sub-pixel 200*a*, a magenta color M may be formed through the combination of the second filter 235*b* and the second color cell 225*b* in the second sub-pixel 200*b*, a BL color may be formed through the combination of the third filter 235*c* and the third color cell 225*c* in the third sub-pixel 200*c*, and a white color W may be formed through the combination of the fourth filter 235*d* and the fourth color cell 225*d* in the fourth sub-pixel 200*d*. As a result, the cyan color from the first sub-pixel 200*a*, the magenta color M from the second sub-pixel 200*b*, and the white color W from the fourth sub-pixel 200*d* are mixed, and thus a bright blue color may be formed by the pixel 200.

Furthermore, in a case of applying the second voltage V2 to the first color cell 225*a* and the second color cell 225*b*, and applying either no voltage or an inverse voltage to the third color cell 225*c* and the fourth color cell 225*d*, a BL color may be formed through the combination of the first filter 235*a* and the first color cell 225*a* in the first sub-pixel 200*a*, a BL color may be formed through the combination of the second filter 235*b* and the second color cell 225*b* in the second sub-pixel 200*b*, a yellow color Y may be formed through the combination of the third filter 235*c* and the third color cell 225*c* in the third sub-pixel 200*c*, and a white color W may be formed through the combination of the fourth filter 235*d* and the fourth color cell 225*d* fourth sub-pixel 200*d*. As a result, a bright yellow color may be formed by the pixel 200. In alternative embodiments, a bright cyan color or bright magenta color may be formed by the above method, where two of four sub-pixels are applied with the second voltage V2.

Referring to FIG. 9, either no voltage or an inverse voltage is applied to the first color cell 225*a*, the second color cell 225*b*, the third color cell 225*c*, and the fourth color cell 225*d*. As a result, all of the first color cell 225*a*, the second color cell 225*b*, the third color cell 225*c*, and the fourth color cell 225*d* become transparent. A cyan light C is transmitted through the first filter 235*a* from a white light and towards the first color cell 225*a*, the cyan light C is transmitted through the transparent first color cell 225*a* and is reflected outward by the reflective layer 215, and thus the cyan light C travels to the outside of the first sub-pixel 200*a*. Furthermore, a magenta light M is transmitted through the second filter 235*b* from a white light and towards the second color cell 225*b*, the magenta light M is transmitted through the transparent second color cell 225*b* and is reflected outward by the reflective layer 215, and thus the magenta light M travels to the outside of the second sub-pixel 200*b*. Furthermore, a yellow light Y is transmitted through the third filter 235*c* from a white light and towards the third color cell 225*c*, the yellow light Y is transmitted through the transparent third color cell 225*c* and is reflected outward by the reflective layer 215, and thus the yellow light Y travels to the outside of the third sub-pixel 200*c*. Furthermore, a white light W is transmitted through the fourth filter 235*d* towards the fourth color cell 225*d*, the white light W is transmitted through the transparent fourth color cell 225*d* and is reflected outward by the reflective layer 215, and thus the white light W travels to the outside of the fourth sub-pixel 200*d*. As a result, the cyan light C from the first sub-pixel 200*a*, the magenta light M from the second sub-pixel 200*b*, the yellow light Y from the third sub-pixel 200*c*, and the white light W from the fourth sub-pixel 200*d* are mixed, and thus a bright white color WHITE1 is formed by pixel 200.

As described above, when all of the color cells of the color switching layer 225 become transparent, a cyan light C, a magenta light M, a yellow light Y, and a white light W, which are lights of natural colors of the first, second, third and fourth color filters 235*a*, 235*b*, 235*c* and 235*d*, may be reflected within the first, second, third and fourth sub-pixels 200*a*, 200*b*, 200*c* and 200*d* to form a bright white color of the pixel 200. Here, a light transmitted through the color filter layer 235 may form a black color based on subtractive color mixture when the color switching layer 225 is in the color changing mode, whereas a light transmitted through the color filter layer 235 may form a white color based on additive color mixture when the color switching layer 225 is in the transmittance mode.

As described above, the present invention provides sub-pixels capable of forming a black color or white color by which contrast and color reproduction characteristic of a display device may be improved. Furthermore, white light efficiency and grayscale characteristic may also be improved. Although examples in which a pixel includes sub-pixels forming different colors from each others are described above, the present invention is not limited thereto, and a pixel may include sub-pixels with any color combinations. In one embodiment, for example, a color filter layer may include a first cyan filter, a second cyan filter, a magenta filter, and a yellow filter.

Although FIGS. 1 and 6 show reflective display devices including reflective layers, a display device may be configured without a reflective layer.

Figure 10:
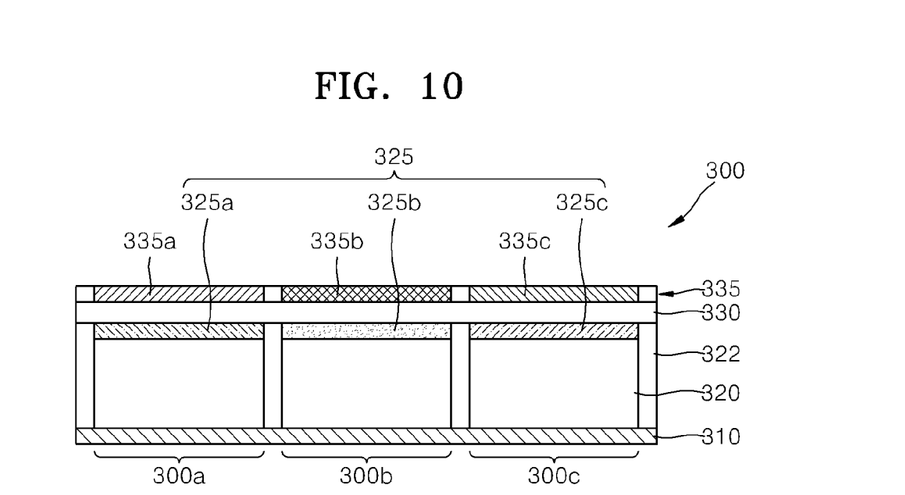
FIG. 10 is a diagram of another embodiment of a display device, according to the present invention.

Another embodiment of display device which is shown in FIG. 10 may include a first electrode layer 310, a color switching layer 325, which is disposed on the first electrode layer 310, a second electrode layer 330, which is disposed on the color switching layer 325, and a color filter layer 335, which is disposed on the second electrode layer 330. The color switching layer 325 is interposed between the first electrode layer 310 and the second electrode layer 330 and may operate in a transmittance mode for transmitting incident light and a color changing mode for changing incident light to predetermined color light, where the color switching layer 325 may be switched between the transmittance mode and the color changing mode by applying a voltage thereto.

The color switching layer 325 may include a first color cell 325a which may transmit incident light or change incident light to a first color light, a second color cell 325b which may transmit incident light or change incident light to a second color light, and a third color cell 325c which may transmit incident light or change incident light to a third color light. Furthermore, the color filter layer 335 may include a first filter 335a which transmits a cyan light, a second filter 335b which transmits a magenta light, and a third filter 335c which transmits a yellow light. The first color cell 325a and the first filter 335a are arranged to face each other, the second color cell 325b and the second filter 335b are arranged to face each other, and the third color cell 325c and the third filter 335c are arranged to face each other, and a black color, white color, and various other colors may be formed through combinations of corresponding color cells and light transmitted through each of the filters 335a, 335b, and 335c. Since the method of forming colors is identical to the method described above with reference to FIGS. 1 and 6, detailed descriptions thereof will be omitted here.

In the display device shown in FIG. 10, a plurality of a pixel may be arranged in a matrix shape. For convenience of explanation, FIG. 10 shows only one pixel 300 of the display device. The pixel 300 may include a plurality of a sub-pixel, and a color image of the display device may include color lights from each of the sub-pixels which are mixed together. Each of the sub-pixels may emit different color lights. However, the present invention is not limited thereto, and the pixel 300 may include a plurality of a sub-pixel, which emits the same color light, in consideration of brightness or efficiency of each color light. In one embodiment, for example, the pixel 300 may include a first sub-pixel 300a, a second sub-pixel 300b, and a third sub-pixel 300c.

A partition 322 may be interposed between each pair of adjacent sub-pixels of the color switching layer 325, to reduce or effectively prevent mixtures of colors within the sub-pixels. The reference numeral 320 indicates an electrolyte layer. In contrast to the display devices in FIGS. 1 and 6, the display device shown in FIG. 10 does not include a reflective layer.

The display device shown in FIG. 10 may be used as a transparent display device. In other words, a color image is formed as an external light is transmitted through the color filter layer 335 and the color switching layer 325, and the color image is viewed by a user. In this case, the image may be displayed on two opposite surfaces of the display device.

Display devices according to embodiments of the present invention may be applied to electronic reading devices (e.g., e-book), for example, where the same effect as forming colors on paper may be acquired. Furthermore, display devices according to embodiments of the present invention may be applied to a reflective display device, which forms a color image by using an external light and displays the color image by reflecting external light by a reflective layer.

Display devices according to embodiments of the present invention do not require a color filter layer stacking process or a color switching layer stacking process, either of which is complex and expensive. Furthermore, by operating each of sub-pixels and combining colors of the same, a black color, white color, and various other colors may be formed by a pixel, and improved contrast ratio and wider range of color formation may be acquired. Therefore, display devices according to embodiments of the present invention may improve display performance of reflective display devices, such as an e-book device.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A display device comprising:
   a first electrode layer;
   a color switching layer comprising:
      a first color cell, which transmits incident light or changes the incident light to a first color light;
      a second color cell, which transmits the incident light or changes the incident light to a second color light; and
      a third color cell, which transmits the incident light or changes the incident light to a third color light;
   a second electrode layer, which is disposed on the color switching layer; and
   a color filter layer, which is disposed on an upper side of the second electrode layer and which directly changes incident light to a color-filtered light without applying a voltage, and comprises:
      a first filter, which transmits a cyan light without applying voltage;
      a second filter, which transmits a magenta light without applying voltage; and
      a third filter, which transmits a yellow light without applying voltage.

2. The display device of claim 1, wherein
   the first color light has a color complementary with respect to the cyan light,
   the second color light has a color complementary with respect to the magenta light, and
   the third color light has a color complementary with respect to the yellow light.

3. The display device of claim 1, wherein
   the first color light comprises a red light,
   the second color light comprises a green light, and
   the third color light comprises a blue light.

4. The display device of claim 1, wherein at least one of the first electrode layer and the second electrode layer includes a transparent conductive material.

5. The display device of claim 1, wherein the color switching layer comprises an electrochromic layer.

6. The display device of claim 1, wherein the color switching layer comprises a polymer dispersed liquid crystal layer mixed with a dichroic dye.

7. The display device of claim 1, wherein the color switching layer comprises red, green, and blue cholesteric liquid crystal layers.

8. The display device of claim 1, wherein the color switching layer comprises an electronic-ink layer having red, green, blue, and white color balls.

9. The display device of claim 1, wherein
   the first color cell and the first filter are arranged to face each other, the second color cell and the second filter are arranged to face each other, and the third color cell and the third filter are arranged to face each other.

10. The display device of claim 1, wherein the color filter layer further comprises a fourth filter, which transmits the incident light.

11. The display device of claim 10, wherein the color switching layer further comprises a fourth color cell, which is arranged to face the fourth filter.

12. The display device of claim 11, wherein the fourth color cell transmits the incident light or changes the incident light to a black light.

13. The display device of claim 1, wherein the color switching layer transmits the incident light or changes colors of the incident light at each of the color cells according to a voltage applied to the color cells.

14. The display device of claim 1, further comprising a reflective layer, which is disposed on the first electrode layer, wherein the color switching layer is between the color filter layer and the reflective layer.

15. A display device comprising:
a first electrode layer;
a color switching layer, which is disposed on the first electrode layer and comprises:
a first color cell, which transmits incident light or changes the incident light to a first color light;
a second color cell, which transmits the incident light or changes the incident light to a second color light; and
a third color cell, which transmits the incident light or changes the incident light to a third color light;
an electrolyte layer between the first electrode layer and the color switching layer;
a second electrode layer, which is disposed on the color switching layer between the first and second electrode layers; and
a color filter layer, which is disposed on the second electrode layer between the color filter layer and the color switching layer and comprises:

a first filter, which transmits a cyan light without applying voltage;
a second filter, which transmits a magenta light without applying voltage; and
a third filter, which transmits a yellow light without applying voltage.

16. The display device of claim 15, wherein the color switching layer transmits the incident light or changes colors of the incident light at each of the color cells according to a voltage applied to the color cells.

17. The display device of claim 15, wherein
the first color light comprises a red light,
the second color light comprises a green light, and
the third color light comprises a blue light.

18. The display device of claim 16, wherein the first electrode layer and the second electrode layer include a transparent conductive material.

19. The display device of claim 15, the color switching layer comprises an electrochromic layer.

20. The display device of claim 15, wherein the color switching layer comprises a polymer dispersed liquid crystal layer mixed with a dichroic dye.

21. The display device of claim 15, wherein the color switching layer comprises red, green, and blue cholesteric liquid crystal layers.

22. The display device of claim 15, wherein the color switching layer comprises an electronic ink having red, green, blue, and white color balls.

23. The display device of claim 15, wherein
the first color cell and the first filter are arranged to face each other,
the second color cell and the second filter are arranged to face each other, and
the third color cell and the third filter are arranged to face each other.

* * * * *